United States Patent
Manning et al.

(10) Patent No.: US 8,055,991 B2
(45) Date of Patent: Nov. 8, 2011

(54) ERROR DETECTION AND RECOVERY USING AN ASYNCHRONOUS TRANSACTION JOURNAL

(75) Inventors: David Franklin Manning, Victoria (CA); David James Shepherd, Victoria (CA)

(73) Assignee: International Business Machines Corporation, Armonk, NY (US)

(*) Notice: Subject to any disclaimer, the term of this patent is extended or adjusted under 35 U.S.C. 154(b) by 999 days.

(21) Appl. No.: 11/955,081

(22) Filed: Dec. 12, 2007

(65) Prior Publication Data

US 2009/0158108 A1 Jun. 18, 2009

(51) Int. Cl.
*H03M 13/00* (2006.01)
*G06F 7/02* (2006.01)

(52) U.S. Cl. .................. 714/819; 714/746

(58) Field of Classification Search .............. 714/15, 714/48–49, 39, 746, 799, 819; 709/201, 709/203, 219, 227, 230; 370/242, 248
See application file for complete search history.

(56) References Cited

U.S. PATENT DOCUMENTS

| | | | |
|---|---|---|---|
| 6,141,785 A * | 10/2000 | Hur et al. | 714/748 |
| 6,545,981 B1 * | 4/2003 | Garcia et al. | 370/242 |
| 6,717,947 B1 * | 4/2004 | Ghodrat et al. | 370/395.1 |
| 7,111,062 B2 * | 9/2006 | Banerjee et al. | 709/224 |
| 2007/0143393 A1 | 6/2007 | Brunswig et al. | |
| 2007/0174419 A1 | 7/2007 | O'Connell et al. | |

\* cited by examiner

*Primary Examiner* — Shelly A Chase
(74) *Attorney, Agent, or Firm* — Yee & Associates, P.C.; Steven L. Bennett

(57) ABSTRACT

Illustrative embodiments provide a computer implemented method, an apparatus, and a computer program product for error detection and recovery using an asynchronous transaction journal. In an illustrative embodiment the computer implemented method receives a request message from a requester, stores the request message in the asynchronous transaction journal and determines whether a sequence number contained within the request message is equal to a predetermined number. When the sequence number is equal, the computer implemented method performs a request in the request message to obtain a result and returns the result to the requester; otherwise the computer implemented method detects an error. The computer implemented method then attempts recovery from the error; otherwise the computer implemented method notifies the requestee.

20 Claims, 3 Drawing Sheets

ERROR DETECTION AND RECOVERY USING AN ASYNCHRONOUS TRANSACTION JOURNAL

BACKGROUND OF THE INVENTION

1. Field of the Invention

The present invention relates generally to an improved data processing system and in particular to, a computer implemented method, apparatus, and a computer program product for error detection and recovery using an asynchronous transaction journal.

2. Description of the Related Art

Asynchronous JavaScript and XML (AJAX), or Ajax, is a technique used by web application developers to create interactive web applications. The intent of the developers using AJAX is to make the resulting web pages more responsive by sending to and receiving from the server, small packets of data in the background eliminating the need to reload the entire web page each time a user requests a change. Use of AJAX typically increases the interaction, speed, function, and usability of a web page.

The advent of AJAX and Web 2.0 has enabled a new breed of highly dynamic, web-based applications. Web 2.0 may be viewed as considering the World Wide Web, or the Internet and the Web as an application platform. With such a platform there are associated "web services," with ad serving as an example of a widely deployed web service. Many such applications now use AJAX to post changes in a hypertext markup language based user interface to server-side application logic. The response to these posted changes often contains instructions that are used to update the graphical user interface to reflect the resulting changes in the application's logic.

In these applications, it is reasonable to say that AJAX messages are used to synchronize changes in a hypertext markup language based graphical user interface with a server-based application environment. For example, in a hypertext markup language based time-sheet system, a hypertext markup language form representing a time sheet to a user might use AJAX to interact with server-side application logic to create a dynamic user experience. In such a system, user changes made to the hypertext markup language form, such as a change in the "hours worked" Monday, might be transmitted to the server and resulting graphical user interface changes, such as to the "total hours worked this week" field, would be propagated back down to the graphical user interface. As the user continues to work with the time-sheet graphical user interface, more messages are produced to propagate those changes to the server and the responses to the messages cause further updates to the timesheet graphical user interface.

Such systems provide a dynamic and interactive user experience, but have the potential to become unpredictable if the hypertext markup language based graphical user interface and the server-side logic are no longer synchronized. For example, a condition that may lead to a server-based application to no longer be synchronized with the associated hypertext markup language based graphical user interface is when an AJAX message becomes lost during transmission or execution. Network failure could make it impossible for an AJAX transaction to be completed. The network might fail either before or after the state of the server-side logic was updated. In this case, it may be possible for the server-side logic to no longer be synchronized with the state of the hypertext markup language display.

In another example, a server could fail in a clustered application scenario. When the application is a clustered application using several application servers and one of the servers fails before the failing server can propagate state information to the remaining servers in the cluster, there is a possibility that the hypertext markup language based graphical user interface and the state of the failover application server could no longer be synchronized.

In another example, a server could encounter an error during the processing of an AJAX request. Again, depending on the architecture of the application, this could cause the state of the server-side application to no longer be synchronized with the hypertext markup language based graphical user interface.

Clearly, AJAX-based Web 2.0 applications require a mechanism to help detect and recover from these failure conditions.

SUMMARY OF THE INVENTION

Illustrative embodiments provide a computer implemented method, an apparatus, in the form of a data processing system and a computer program product for error detection and recovery using an asynchronous transaction journal. In one illustrative embodiment, the computer implemented method receives a request message from a requester, stores the request message in a set of request messages in a transaction journal and determines whether a sequence number contained within the request message is equal to a predetermined number. The computer implemented method responds to determining the sequence number equal to the predetermined number, by performing a request in the request message to obtain a result. The computer implemented method returns the result to the requester and responds to a determination that the sequence number is a number other than the predetermined number, identifying a presence of an error to form a detected error, and performing error recovery for the detected error.

In another illustrative embodiment, the data processing system comprises a bus, a memory connected to the bus, a persistent storage connected to the bus, wherein the persistent storage comprises computer executable instructions, a communications unit connected to the bus, a display connected to the bus, a processor connected to the bus, wherein the processor executes the computer executable instructions causing the data processing system to receive a request message from a requester, store the request message in a set of request messages in a transaction journal, and determine whether a sequence number contained within the request message is equal to a predetermined number. The processor further executes the computer executable instructions causing the data processing system to be responsive to determining the sequence number equal to the predetermined number, to perform a request in the request message to obtain a result and return the result to the requester and to be responsive to a determination that the sequence number is a number other than the predetermined number, identifying a presence of an error to form a detected error; and performing error recovery for the detected error.

In an illustrative embodiment, the computer program product comprises a computer usable recordable medium comprising computer executable program code thereon, the computer executable program code comprises computer executable program code for receiving a request message from a requester, computer executable program code for storing the request message in a set of request messages in a transaction journal and computer executable program code for determining whether a sequence number contained within the request message is equal to a predetermined number. The computer program product further comprising computer executable program code responsive to determining the sequence number equal to the predetermined number, for performing a request in the request message to obtain a result and returning the result to the requester, computer executable program code responsive to a determination that the sequence number is a number other than the predetermined number, identifying a presence of an error to form a detected error, and computer executable program code for performing error recovery for the detected error.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
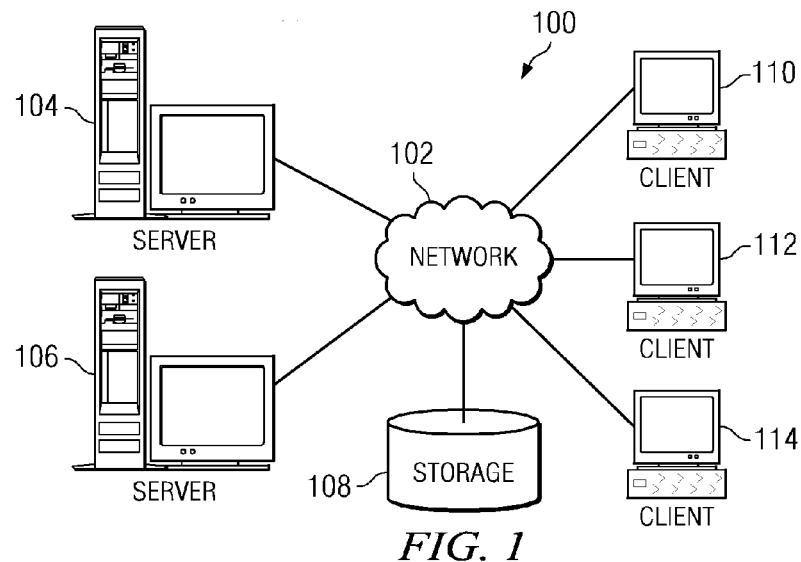
FIG. 1 is a pictorial representation of a network of data processing systems in which illustrative embodiments may be implemented.
Figure 2:
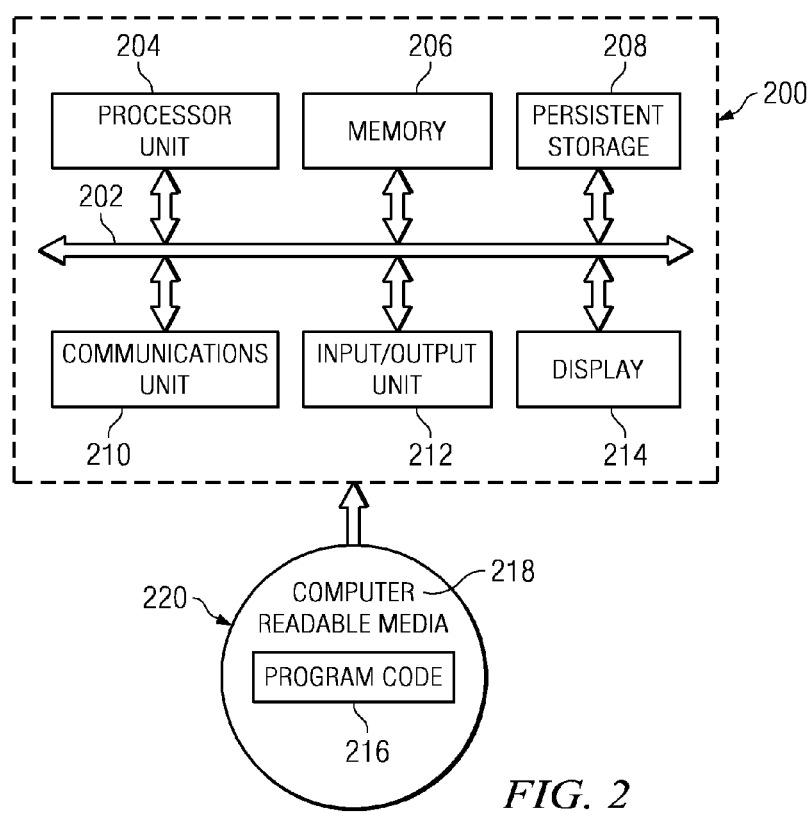
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

AJAX transaction journaling applies a technique used to better ensure information or message packet ordering in low-level networking to the problem of message sequencing in Web 2.0 applications. Using AJAX asynchronous transaction journaling, AJAX messages are sequenced and recorded to enable recovery from attempting to process an out of sequence message containing a request. For example, in the network system of FIG. 1, by examining the sequence of the message stream, transmitted through a network, such as network 102, the application server, such as server 104, can determine if there have been user interface changes on a client, such as client 110, that have not been properly recorded in the application server state. In this case, the application server, server 104, can request that the user interface of client 110, "replay" any transactions that were lost as result of a network error, server failover, or application error condition.

AJAX transaction journaling addresses the issues of detection and correcting the problem of the lost transaction. Detecting a break in the sequence of AJAX messages used to synchronize a hypertext markup language user interface with the associated server-side application logic assigns a sequence number to each message. The sequence number is incremented with each message sent.

Both client user interface and server logic maintain a record of the sequence number for the most recently fully processed message. If the server-side application logic receives a message that is not tagged with the expected "next" sequence number, the state of the application logic and the user interface are no longer synchronized and an error condition exists.

When a synchronization error is detected, the server-based application logic responds to the out-of-sequence AJAX message with an indication of the error and the sequence number of the last message that was successfully processed. When the user interface receives notification from the server, it "replays" from a cache the messages from that last successful sequence number up to its current state. Once the message sequence is successfully re-established, transactions can continue as normal.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation.

Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
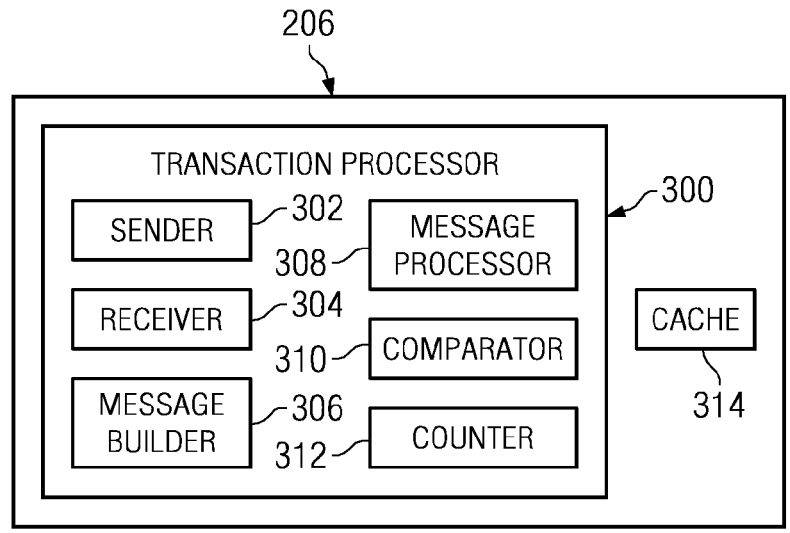
FIG. 3 is a block diagram of a portion of a transaction processor in accordance with illustrative embodiments.

With reference to FIG. 3, a block diagram of a portion of a transaction processor in accordance with illustrative embodiments is shown. Transaction processor 300 is an example of a transaction processor in accordance with illustrative embodiments of the present invention. Transaction processor 300 is depicted within memory 206 of system 200 of FIG. 2. Transaction processor 300 is illustrated as a collection of modules comprising sender 302 for sending messages, receiver 304 for receiving messages, message builder 306 for creating messages, message processor 308 for processing message contents, comparator 310 for comparing sequence numbers of messages, counter 312 for maintaining a message sequence number, and a cache 314 as temporal message storage.

Transaction processor 300 may be implemented in an exemplary manner in each of server 104 and client 110 of FIG. 1 to provide function in support of application processing using AJAX and Web 2.0 web-based applications. Sender 302 provides an outbound communication link while receiver 304 provides an inbound communication link that may for example be implemented in the form of two modules. The combined support of the modules enables bi-directional communication between a pair of modules installed on one system and another similar pair on another system.

Message builder 306 takes a sequence number from counter 312 and adds the sequence number to a created message before sending the message out through sender 302. Message processor 308 receives a message and requests comparator 310 to compare the sequence number of the received message with a sequence number created by counter 312. Typically, a sequence number may be embedded in the header portion of a message; however applications may also choose to implement sequence numbers as an application specific filed within a message. Sequence number location within a message may therefore vary according to a message protocol used. The location of the sequence number does not affect message processing because both client and server are presumed to understand the messaging protocol used.

Cache 314 is a storage area used to hold the stream of messages processed by transaction processor 300. Cache 314 may have a specified threshold for messages in the form of number of messages or just storage usage. For example, the cache may allocate space for messages and when the space is used, simply overwrite the earlier messages in a circular use patter. Cache 314 may also manage messages saved by number of messages, such as maintaining the most recent five messages. Typically, a cache for message journaling need not be large as message misses are to be detected earlier rather than later to aid in recovery.

Figure 4:
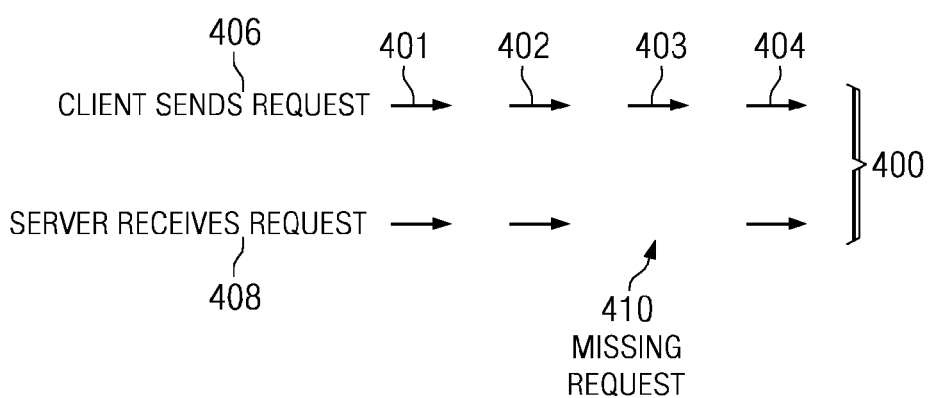
FIG. 4 is a block diagram of a message stream flow of the transaction processor in FIG. 3 in accordance with illustrative embodiments.

FIG. 4 is a block diagram of a message stream flow of the transaction processor in FIG. 3 in accordance with illustrative embodiments. Message stream 400 depicts a typical flow of messages processed by transaction processor 300 of FIG. 3 in accordance with illustrative embodiments.

Message stream 400 shows a series of message pairs 401-404 between client 406 and server 408. Message stream 400 represents a typical communication between client 406 and server 408 in which pairs of messages containing requests or request messages are exchanged. Messages and request messages may be used interchangeably. Pairs of messages are exchanged because each request from client 406 is responded to by server 408. Each message in the stream is tracked using a sequence number, allowing client 406 and server 408 to determine if any message is missing. The portion of the message stream from server 408 shows the server side message of message pair 403 missing. The missing portion of message pair 403 is noted as missing request 410. In this example, a server processing error or a network error may have occurred. This error may result in the failure to generate a response to client 406.

Figure 5:
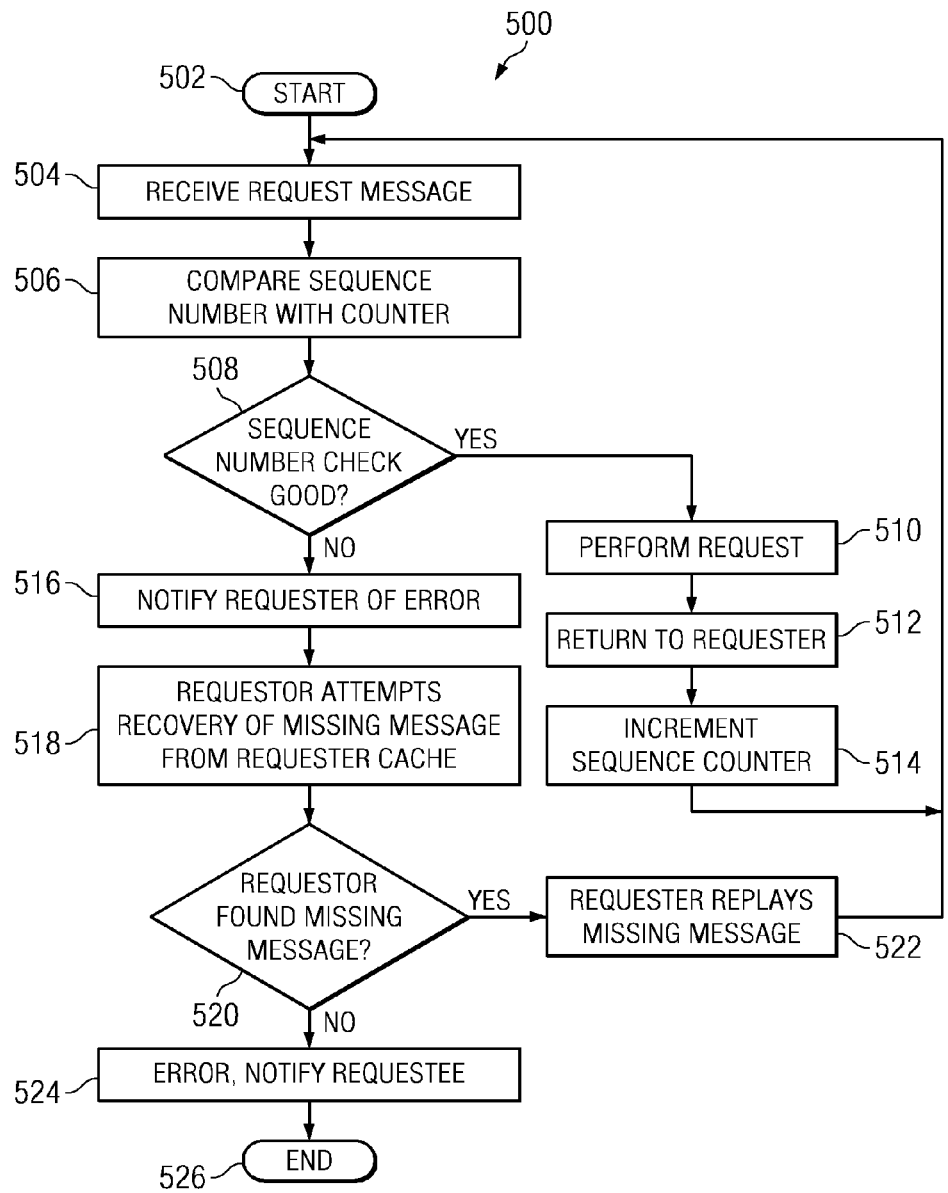
FIG. 5 is a flowchart of a process of the transaction processor of FIG. 3 in accordance with illustrative embodiments.

FIG. 5 is a flowchart of a process of the transaction processor of FIG. 3 in accordance with illustrative embodiments. Process 500 is an example of message processing as used in an implementation of transaction processor 300 of FIG. 3. Throughout process 500 use of the term message is meant to refer to a set of messages comprising one or more messages.

Process 500 begins (step 502) and a receiver receives a request message (step 504). Using the previous example, a user changes a hypertext markup language form, modify the "hours worked" Monday. This change is typically transmitted to the server as a request in a message. The server processes the change. The processed change may cause the "total hours worked this week" field, to be updated and a change would be propagated back to the graphical user interface in another request. As the user continues to work with the time-sheet graphical user interface, more messages are produced to propagate those changes to the server and the responses to the messages cause further updates to the timesheet graphical user interface.

A sequence number of the received message is compared with the sequence number of a counter (step 506). A determination is then made whether the sequence number of the request message is the same as the sequence number of the counter (step 508). If the numbers compare equal, a "yes" results, otherwise a "no" is returned.

If a "yes" is obtained in step 508, the operation requested in the request message is performed (step 510). The results of the requested operation are returned to the requester (step 512). The counter is then incremented by one (step 514) and process 500 returns to step 504 ready for another request.

If a "no" is obtained in step 508, a notification is sent to the requester indicating an error due to a missing request message (step 516). An attempt to recover the missing request message associated with the current sequence number is performed by the requester (step 518). A requester cache containing the temporal copies of recent messages is searched for the request message associated with the expected sequence number (step 520).

For example, if transaction process 300 of FIG. 3, on server 104 of FIG. 1, had just sent a message with a sequence number "65" to client 110 of FIG. 1, client 110 would be expecting a message response with a sequence number of "65". If client 110 receives a message with a sequence number other than "65" then an error is detected and the requester on client 110 would initiate a recovery process to replay the missing set of messages. A sequence number larger than "65" indicates a message was lost.

If a missing request message is located in step 520, a "yes" result is obtained, otherwise no request message is located and a "no" results. If a "yes" was obtained in step 520, the requester replays the missing set of request messages as needed (step 522) and loops back to step 504. Replaying the missing request messages in the set of request messages allows for the recovery or re-synchronization of the request message processing between the requester on the client and the requestee on the server. If a "no" was obtained in step 520, an error is detected and the requestee, typically the server, is notified (step 524) with process 500 terminating thereafter (step 526).

Thus, the illustrative embodiments provide a computer implemented method, apparatus, and computer program product for managing errors. In one embodiment, a transaction processor is able to determine if a message to be processed has been missed and when missed attempt a recovery operation for the missing message. A requester may also be informed of the recovery action or the failure to recover, thereby typically allowing the process to be better managed and controlled. The problem of a missing message may be determined in these examples by a component, such as a client or server in the message processing transaction. Recovery of messages typically involves the sender attempting to make the transaction right because the sender had previously sent the "missing" message. The cache of the sender would thus be used to locate the missing message.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable recordable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for error detection and recovery using an asynchronous transaction journal, the computer implemented method comprising:
   receiving a request message from a requester;
   storing the request message in a set of request messages in the asynchronous transaction journal;
   determining whether a sequence number contained within the request message is equal to a predetermined number;
   responsive to determining the sequence number equal to the predetermined number, performing a request in the request message to obtain a result and returning the result to the requester;
   responsive to a determination that the sequence number is a number other than the predetermined number, identifying a presence of an error to form a detected error; and
   performing error recovery for the detected error.

2. The computer implemented method of claim 1, wherein storing the request message in a set of request messages in a transaction journal comprises:
   storing the set of request messages in a cache.

3. The computer implemented method of claim 1, wherein performing a request in the request message to obtain a result and returning the result to the requester further comprises:
   incrementing a counter by one.

4. The computer implemented method of claim 1, wherein detecting an error further comprises:
   identifying the request message having the sequence number, other than the predetermined number, in the set of messages in the transaction journal to form an identified request message.

5. The computer implemented method of claim 4, wherein recovering from the error further comprises:
   performing a request in the identified request message to obtain a result and returning the result to the requester;
   incrementing a counter by one; and
   replaying each request message in the set of request messages in the transaction journal until the sequence number of the request message equals the predetermined number.

6. The computer implemented method of claim 1, wherein detecting an error further comprises:
   failing to find the request message having the sequence number, other than the predetermined number, in the set of request messages in the transaction journal; and
   notifying the requestee of the error.

7. The computer implemented method of claim 1, wherein the predetermined number is maintained in a counter.

8. A data processing system for error detection and recovery using an asynchronous transaction journal, the data processing system comprising:
   a bus;
   a memory connected to the bus;
   a persistent storage connected to the bus, wherein the persistent storage comprises computer executable instructions;
   a communications unit connected to the bus;
   a display connected to the bus;
   a processor connected to the bus, wherein the processor executes the computer executable instructions causing the data processing system to:
   receive a request message from a requester;
   store the request message in a set of request messages in the transaction journal;
   determine whether a sequence number contained within the request message is equal to a predetermined number;
   responsive to a determination that the sequence number is a number other than the predetermined number, identifying a presence of an error to form a detected error; and
   perform error recovery for the detected error.

9. The data processing system of claim 8, wherein the processor executes the computer executable instructions causing the data processing system to store the request message in a set of request messages in a transaction journal further comprises:
   storing the set of request messages in a cache.

10. The data processing system of claim 8, wherein the processor executes the computer executable instructions causing the data processing system to perform a request in the request message to obtain a result and return the result to the requester further comprises:
    incrementing a counter by one.

11. The data processing system of claim 8, wherein the processor executes the computer executable instructions causing the data processing system to detect an error further comprises:
    identifying the request message having the sequence number, other than the predetermined number, in the set of messages in the transaction journal to form an identified request message.

12. The data processing system of claim 11, wherein the processor executes the computer executable instructions causing the data processing system to recover from the error further comprises:
    performing a request in the identified request message to obtain a result and returning the result to the requester;
    incrementing a counter by one; and
    replaying each request message in the set of request messages in the transaction journal until the sequence number of the request message equals the predetermined number.

13. The data processing system of claim 8, wherein the processor executes the computer executable instructions causing the data processing system to detect an error further comprises:

failing to find the request message having the sequence number, other than the predetermined number, in the set of request messages in the transaction journal; and notifying the requestee of the error.

14. The data processing system of claim 8, wherein the predetermined number is maintained in a counter.

15. A computer program product for error detection and recovery using an asynchronous transaction journal, the computer program product comprising a computer usable recordable medium comprising computer executable program code thereon, the computer executable program code comprising:
   computer executable program code for receiving a request message from a requester;
   computer executable program code for storing the request message in a set of request messages in a transaction journal;
   computer executable program code for determining whether a sequence number contained within the request message is equal to a predetermined number;
   computer executable program code, responsive to a determination that the sequence number is a number other than the predetermined number, identifying a presence of an error to form a detected error; and
   computer executable program code for performing error recovery for the detected error.

16. The computer program product of claim 15, wherein computer executable program code for storing the request message in a set of request messages in a transaction journal comprises:
   computer executable program code for storing the set of request messages in a cache.

17. The computer program product of claim 15, wherein computer executable program code for performing a request in the request message to obtain a result and returning the result to the requester further comprises:
   computer executable program code for incrementing a counter by one.

18. The computer program product of claim 15, wherein computer executable program code for detecting an error further comprises:
   computer executable program code for identifying the request message having the sequence number, other than the predetermined number, in the set of messages in the transaction journal to form an identified request message.

19. The computer program product of claim 18, wherein computer executable program code for recovering from the error further comprises:
   computer executable program code for performing a request in the identified request message to obtain a result and returning the result to the requester;
   computer executable program code for incrementing a counter by one; and
   computer executable program code for replaying each request message in the set of request messages in the transaction journal until the sequence number of the request message equals the predetermined number.

20. The computer program product of claim 15, wherein computer executable program code for detecting an error further comprises:
   computer executable program code for failing to find the request message having the sequence number, other than the predetermined number, in the set of request messages in the transaction journal; and
   computer executable program code for notifying the requestee of the error.

* * * * *